(12) United States Patent
Shih et al.

(10) Patent No.: US 6,708,370 B2
(45) Date of Patent: Mar. 23, 2004

(54) LOCKING STRUCTURE

(75) Inventors: Jr-Teng Shih, Taoyuan (TW); Chao-Yuan Lo, Tucheng (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 10/282,874

(22) Filed: Oct. 29, 2002

(65) Prior Publication Data

US 2004/0016081 A1 Jan. 29, 2004

(30) Foreign Application Priority Data

Jul. 29, 2002  (TW) ........................... 91116931 A

(51) Int. Cl.⁷ ............................................. E05D 11/10
(52) U.S. Cl. ............................ 16/332; 16/335; 16/342
(58) Field of Search .......................... 16/332, 334, 319, 16/321, 326, 342, 335

(56) References Cited

U.S. PATENT DOCUMENTS

| | | | | |
|---|---|---|---|---|
| 3,644,023 A | * | 2/1972 | Villani ..................... | 351/113 |
| 3,691,788 A | * | 9/1972 | Mazziotti ................. | 464/139 |
| 3,908,228 A | * | 9/1975 | Newcomer ................. | 16/286 |
| 5,412,842 A | * | 5/1995 | Riblett ..................... | 16/334 |
| 5,867,871 A | * | 2/1999 | Tasman ..................... | 16/335 |
| 5,918,347 A | * | 7/1999 | Morawetz ................... | 16/322 |
| 6,070,294 A | * | 6/2000 | Perkins et al. ............. | 16/252 |

FOREIGN PATENT DOCUMENTS

| | | | |
|---|---|---|---|
| DE | 3639928 A1 | * | 6/1988 |
| DE | 20215123 U1 | * | 11/2002 |
| EP | 220579 A | * | 5/1987 |
| FR | 2334808 A | * | 8/1977 |
| JP | 3228986 A | * | 10/1991 |
| WO | WO 95/14842 | * | 6/1995 |

* cited by examiner

Primary Examiner—Chuck Y. Mah

(57) ABSTRACT

A locking structure for a notebook computer with a main body and a monitor covering the main body. The locking structure includes a first support, a locking mechanism and a second support. The first support is set in the main body. The locking mechanism has a spring, a plug and a shaft. The spring is disposed in the first support. The plug is disposed on the spring. The shaft pivots to the first support and pushes against the plug. The shaft has a recess. The second support is set in the monitor and connected to the shaft of the locking mechanism. The plug is engaged in the recess by resilient force provided by the spring when the second support rotates to rotate the recess of the shaft onto the plug.

7 Claims, 4 Drawing Sheets

LOCKING STRUCTURE

BACKGROUND OF THE INVENTION

1. Field of the Invention

The present invention relates to a locking structure, and in particular to a locking structure combining a supporting mechanism.

2. Description of the Related Art

Generally speaking, a portable computer 1 is composed of a mainframe 2 and an LCD monitor 4, as shown in FIG. 1. When the LCD monitor 4 covers the mainframe 2, the LCD monitor 4 and the mainframe 2 are fastened by a latch 6. The latch 6 may be disposed on the LCD monitor 4. Additionally, the portable computer 1 may have one or more latches 6 to fasten the LCD monitor 4 and the mainframe 2.

Nevertheless, the latch 6 influences the appearance of the portable computer 1 and reduces space for disposing other devices. For example, when an infrared module is required on the LCD monitor 4 or the mainframe 2, the latch 6 causes inconvenience in the disposition thereof.

Consequently, the invention provides a locking structure combining a locking mechanism with a supporting mechanism to overcome the aforementioned problems. Namely, the locking mechanism is disposed in the supporting mechanism such that the appearance of the portable computer is improved and the space for disposing other devices is increased.

SUMMARY OF THE INVENTION

An object of the invention is to provide a locking structure for a notebook computer with a main body and a monitor covering the main body. The locking structure comprises a first support, a locking mechanism and a second support. The first support is set in the main body. The locking mechanism has a spring, a plug and a shaft. The spring is disposed in the first support. The plug is disposed on the spring. The shaft pivots to the first support and pushes against the plug. The shaft has a recess. The second support is set in the monitor and connected to the shaft of the locking mechanism. The plug is engaged in the recess by resilient force provided by the spring when the second support rotates to rotate the recess of the shaft onto the plug.

Preferably, the plug is a circular pin.

Preferably, the recess is a circular part for receiving the plug. The configuration of the plug corresponds to that of the recess.

Preferably, the recess is a triangular recess.

Preferably, the locking structure further comprises a barricade disposed in the first support. The spring is fixed to the barricade.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
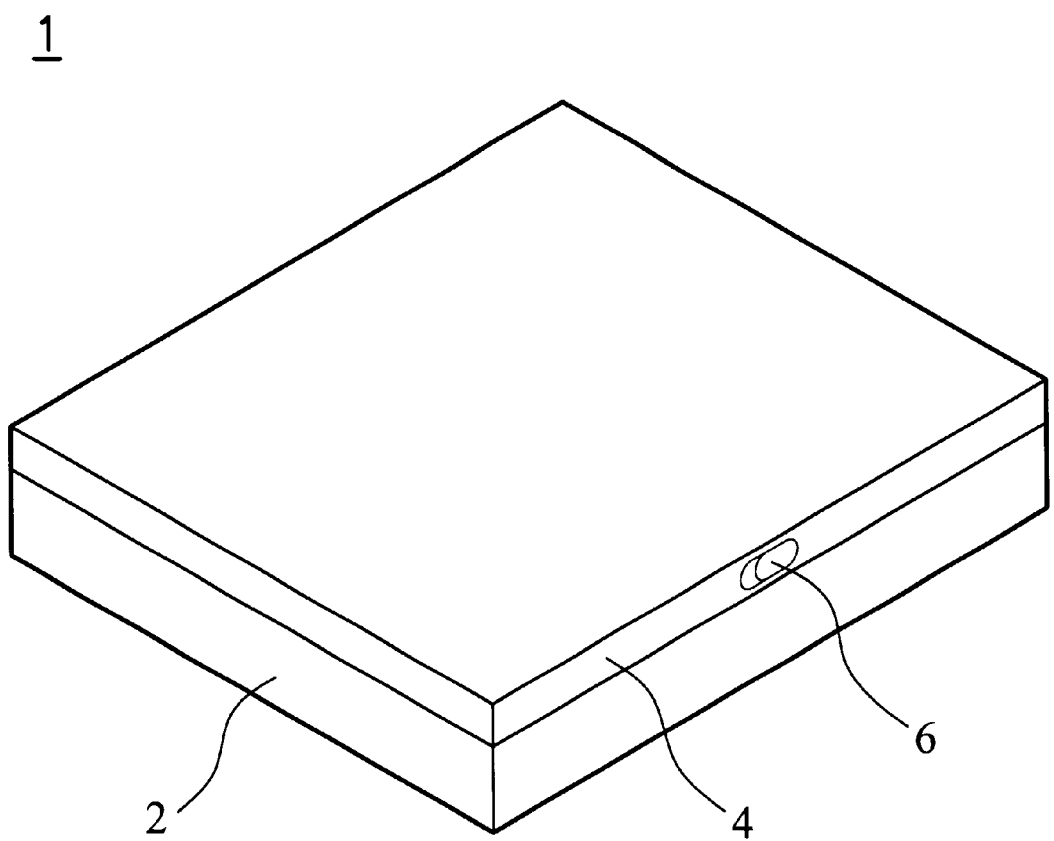
FIG. 1 shows a portable computer having a conventional latch.
Figure 2A:
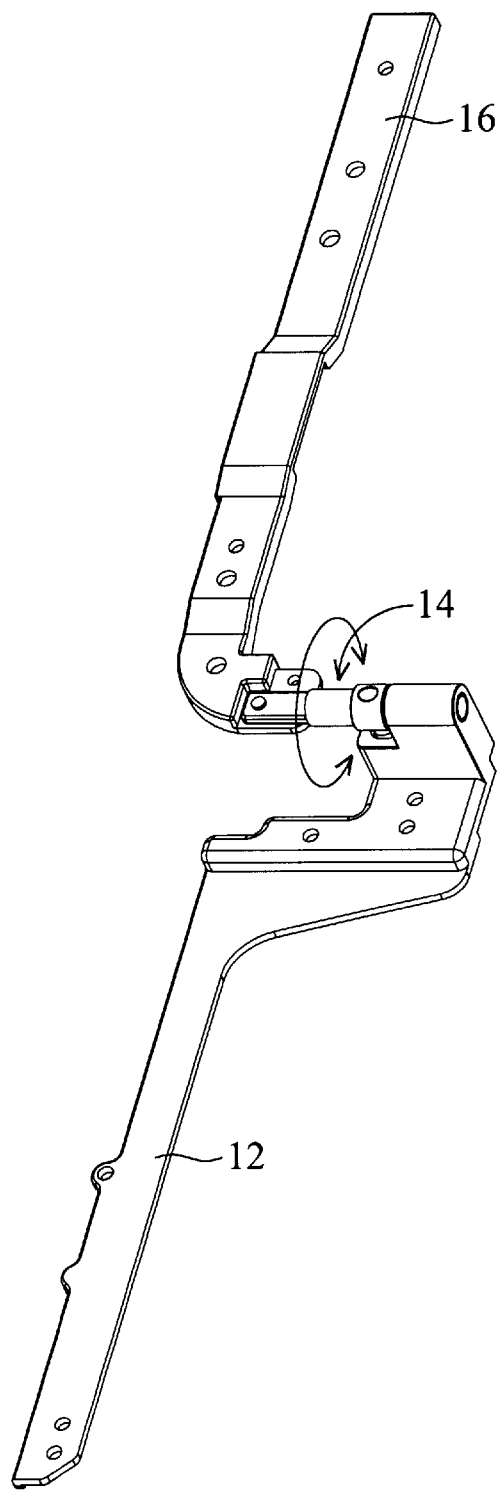
FIG. 2A is a perspective view showing the locking structure of the invention.
Figure 2B:
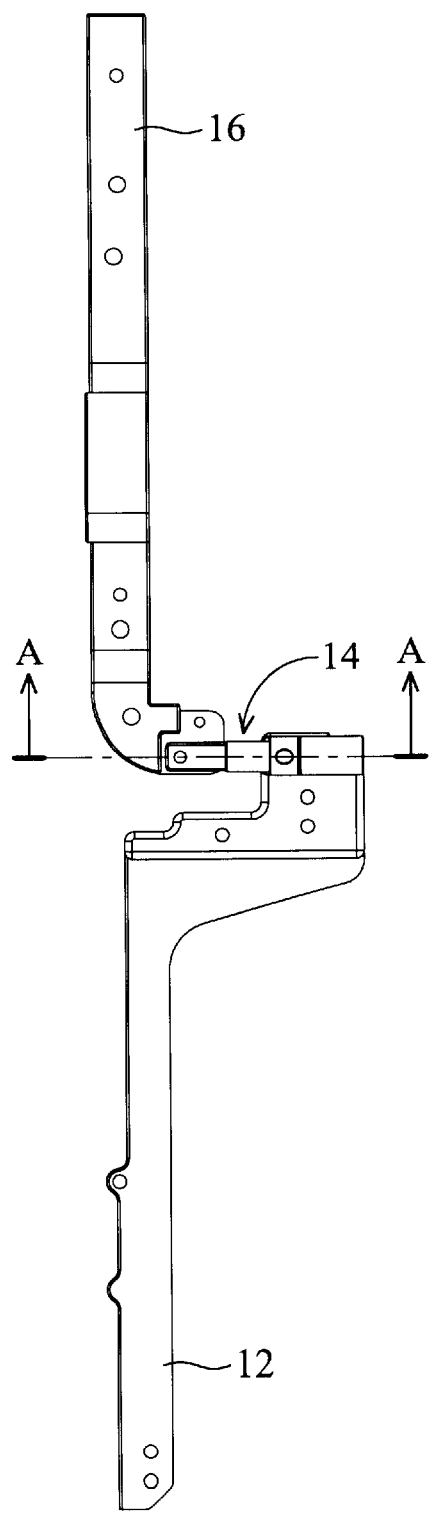
FIG. 2B is a top view showing the locking structure of the invention.

Referring to FIG. 2A and FIG. 2B, the locking structure 10 is disposed in the portable computer 1 shown in FIG. 1. The locking structure 10 supports the LCD monitor 4 and the mainframe 2. Specifically, the portable computer 1 has two symmetric locking structures 10.

The locking structure 10 comprises a first support 12, a locking mechanism 14 and a second support 16. The first support 12 and the second support 16 are disposed in the mainframe 2 and the LCD monitor 4, respectively, such that the mainframe 2 and the LCD monitor 4 are supported. In addition, the locking mechanism 14 also serves as a hinge between the first support 12 and the second support 16. Thus, the second support 16 can rotate with respect to the first support 12.

Figure 3:
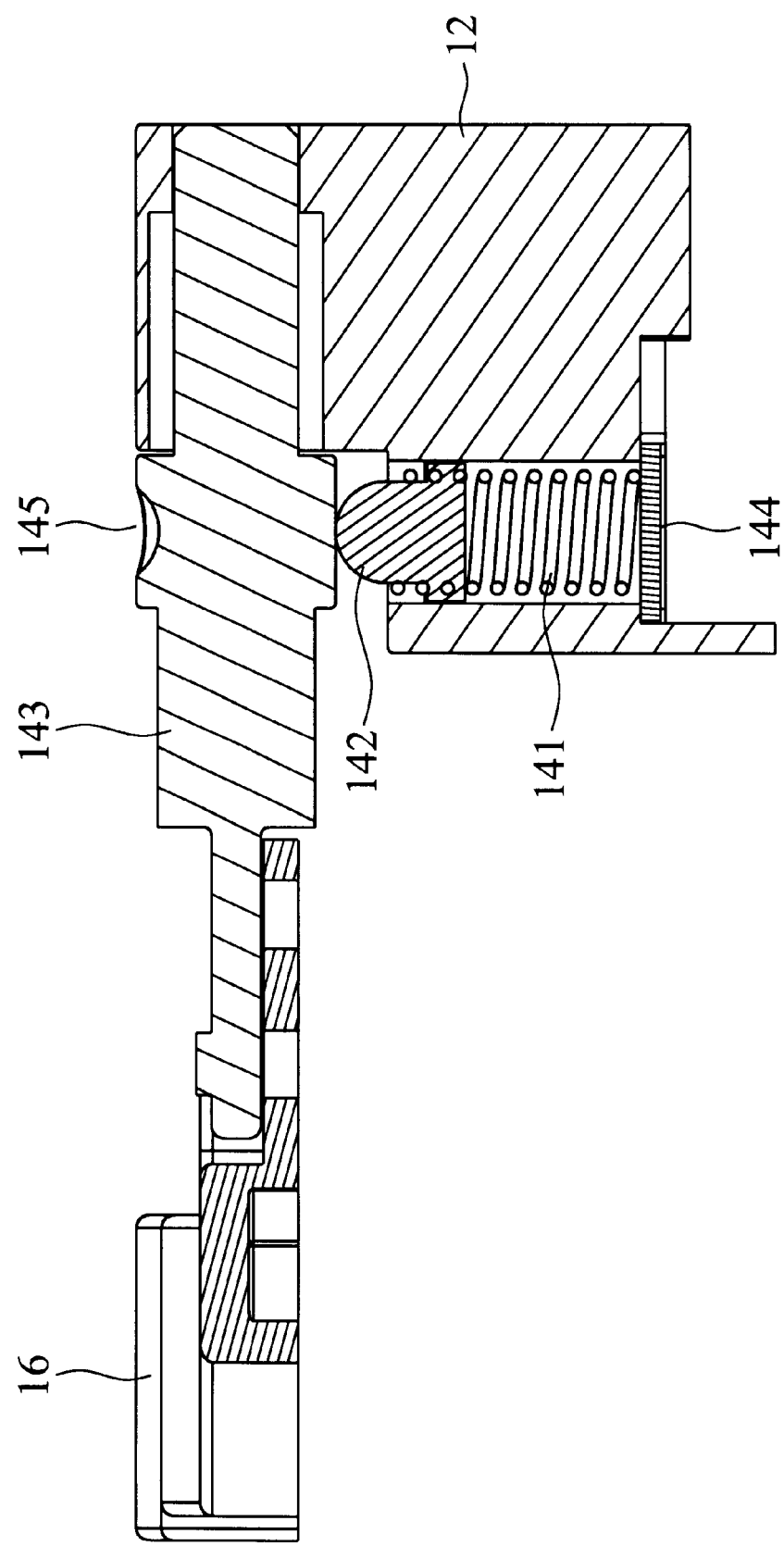
FIG. 3 is a cross section taken along line A—A of FIG. 2B.

Referring to FIG. 3, the locking mechanism 14 comprises a spring 141, a plug 142 and a shaft 143. The spring 141 is disposed in the first support 12. The plug 142 is disposed on the spring 141. Moreover, a barricade 144 is disposed in the first support 12 and the spring 141 is fixed to the barricade 144 for providing resilient force to the plug 142.

The shaft 143 is rotationally disposed on the plug 142. Namely, the shaft 143 pivots to the first support 12 and pushes against the plug 142. Meanwhile, a recess 145 is formed on the shaft 143. When the recess 145 of the shaft 143 rotates onto the plug 142, the plug 142 is engaged in the recess 145 by the resilient force provided by the spring 141.

In addition, the configuration of the plug 142 corresponds to that of the recess 145. For example, in this embodiment, the plug 142 is a circular pin having a spherical top end while the recess 145 is a circular hole. Thus, the plug 142 is easily engaged in and removed from the recess 145. Accordingly, the plug 142 and the recess 145 are not limited to a definite configuration. For example, the plug 142 may have a triangular top end while the recess 145 may be a triangular hole.

The following is a description of the operation of this embodiment.

When the LCD monitor 4 covers the mainframe 2, the plug 142 is positioned in the recess 145. When the LCD monitor 4 is uncovered, the second support 16 (the LCD monitor 4) is rotated and force is exerted to separate the plug 142 from the recess 145. Then, the plug 142 is separated from the recess 145 and pushed downward by the shaft 143 to compress the spring 141. At this time, the LCD monitor 4 is in open position.

When the LCD monitor 4 covers the mainframe 2, the second support 16 (the LCD monitor 4) is rotated until the plug 142 is under the recess 145. At this time, the plug 142 rises to be positioned in the recess 145 by the resilient force provided by the spring 141. Thus, the plug 142 is engaged in the recess 145 and the LCD monitor 4 is in closed position.

While the invention has been described by way of examples and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A locking structure for a notebook computer comprising:
   a main body;
   a monitor covering the main body;
   a first support set in the main body;
   a locking mechanism with a barricade, a spring, a plug and a shaft, wherein the barricade is disposed in the first support, the spring is fixed to the barricade, the plug is disposed on the spring, the plug has a triangular top end, the shaft pivots to the first support and pushes against the plug, the shaft has a recess, and the recess is a triangular hole; and
   a second support set in the monitor, connected to the shaft of the locking mechanism, wherein the plug is engaged in the recess by resilient force provided by the spring when the second support rotates to rotate the recess of the shaft onto the plug.

2. The locking structure as claimed in claim 1, wherein the plug is a circular pin.

3. The locking structure as claimed in claim 2, wherein the recess is a circular part for receiving the plug.

4. A locking mechanism, comprising:
   a barricade;
   a spring fixed to the barricade;
   a plug disposed on the spring and having a triangular top end; and
   a shaft rotationally disposed on the plug, wherein the shaft has a recess and the plug pushes against the shaft, the recess is a triangular hole, and the plug is engaged in the recess by resilient force provided by the spring when the recess of the shaft rotates onto the plug.

5. The locking mechanism as claimed in claim 4, wherein the plug is a circular pin.

6. The locking mechanism as claimed in claim 5, wherein the recess is a circular part for receiving the plug.

7. A locking structure for a notebook computer comprising:
   a main body;
   a monitor connecting with the main body;
   a first support set in the main body;
   a locking mechanism with a spring, a plug and a shaft, wherein the spring is disposed in the first support, the plug is disposed on the spring, the shaft pivots to the first support and pushes against the plug, and the shaft has a recess;
   a second support set in the monitor, connected to the shaft of the locking mechanism, wherein the plug is engaged in the recess by resilient force provided by the spring when the second support rotates to rotate the recess of the shaft onto the plug; and
   when the main body and the monitor are in a close state, the monitor covers the main body, and the first support set and the second support set are parallel to each other;
   when the main body and the monitor are in an open state, the plug is engaged in the recess, and the first support set and the second support set are substantially perpendicular to each other.

* * * * *